United States Patent [19]

Connor

[11] Patent Number: 4,485,384
[45] Date of Patent: Nov. 27, 1984

[54] MICROWAVE SYSTEM

[76] Inventor: Frank R. Connor, Flat 3, 10 Avenue Rd., London SE25 4EA, England

[21] Appl. No.: 251,266

[22] Filed: Apr. 6, 1981

[30] Foreign Application Priority Data

Mar. 5, 1981 [GB] United Kingdom ............... 8106877

[51] Int. Cl.³ ............................................. G01S 1/44
[52] U.S. Cl. .................................. 343/405; 343/402; 343/408; 343/418
[58] Field of Search ............... 343/108 M, 114, 107, 343/102, 113 DE, 113 R, 108 R, 104, 100 CS, 100 SA, 120, 121, 122, 106 R, 106 D, 406, 402, 405, 418, 408

[56] References Cited

U.S. PATENT DOCUMENTS

| | | | |
|---|---|---|---|
| 3,626,419 | 12/1971 | Earp | 343/108 M X |
| 3,670,337 | 6/1972 | Earp et al. | 343/106 D X |
| 3,885,241 | 5/1975 | Overbury | 343/102 X |
| 4,106,023 | 8/1978 | Baghdady | 343/106 D |

FOREIGN PATENT DOCUMENTS

| | | | |
|---|---|---|---|
| 1236141 | 6/1971 | United Kingdom | 343/108 M |
| 1343308 | 1/1974 | United Kingdom | |
| 1538173 | 1/1979 | United Kingdom | |

Primary Examiner—Maynard R. Wilbur
Assistant Examiner—K. R. Kaiser

[57] ABSTRACT

The new invention is a description of a double sideband commutated Doppler microwave system for landing aircraft or spacecraft. It is capable of providing angular information in elevation and azimuth by the measurement of a Doppler frequency in an airborne receiver at a distant point. Furthermore the system has the ability to detect and correct residual multipath errors present in the Doppler signal. It achieves this by the use of an additional beacon signal of known design frequency.

The new system is an air-derived navigation system and the main features of its design include the use of two reference radiators, a single moving source along a baseline of radiators, a Doppler signal for deriving angular information, some useful bandwidth economy, a beacon signal for precise multipath error detection and correction and a large time-bandwidth product for averaging errors.

8 Claims, 4 Drawing Figures

MICROWAVE SYSTEM

SUMMARY

A new invention of a double sideband commutated Doppler system for landing aircraft or spacecraft is described. It is capable of providing angular information in elevation and azimuth, by the measurement of a Doppler frequency in an airborne receiver. The airborne receiver is also able to detect and correct residual multipath errors in the Doppler frequency by means of a beacon signal of known design frequency. The new microwave system is an air-derived navigation system which receives signals from a ground station transmitter and processes them in the airborne receiver.

DETAILED DESCRIPTION

The use of microwave frequencies for landing aircraft has several advantages. Amongst these is the possibility of reducing multipath effects due to signals being reflected from various objects as for example, ground reflection, which causes large errors at lower frequencies. Hence, a considerable amount of work has been undertaken to design a suitable microwave system to replace the present Instrument Landing System (ILS) used at various airports throughout the world.

The invention described here, proposes the design of a microwave double sideband commutated Doppler system for landing aircraft or spacecraft. It employs the well-known Doppler effect which is observed when a source of radiation is moved relative to an observer. At a ground station, means are provided for simulating the moving source of radiation along a set of baseline radiators and relative to two stationary reference radiators. This produces a double sideband signal in a distant airborne receiver and each sideband signal is shifted in frequency by the Doppler effect.

One feature of this invention relates to the use of the double sideband signal for extracting a Doppler frequency which is closely related to the angular direction of aircraft motion. The angular information in this Doppler signal is used by the aircraft for indicating its position in azimuth or elevation.

Another feature of this invention relates to the detection and correction of any multipath errors present in the Doppler signal. This is achieved firstly, by using bi-directional scanning with a single commutating source and a large time-bandwidth product and secondly, by the use of a beacon signal of known design value, for detecting and correcting any residual multipath errors present in the Doppler signal.

Figure 1:
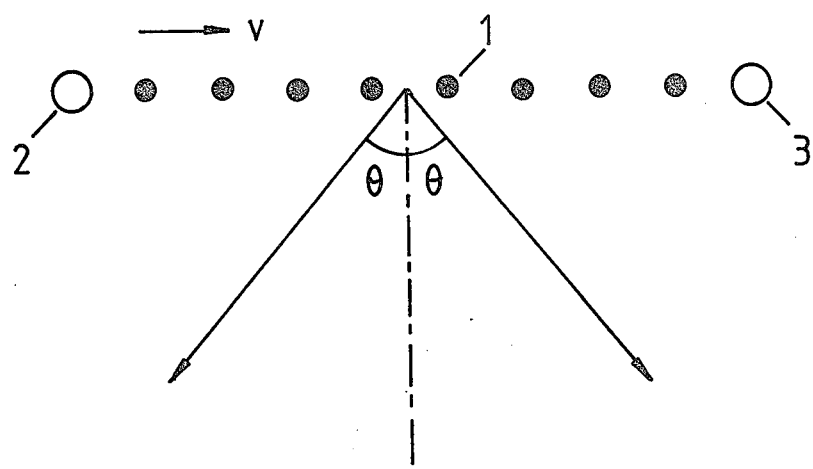
FIG. 1 is a schematic arrangement of the azimuth antenna configuration.
Figure 2:
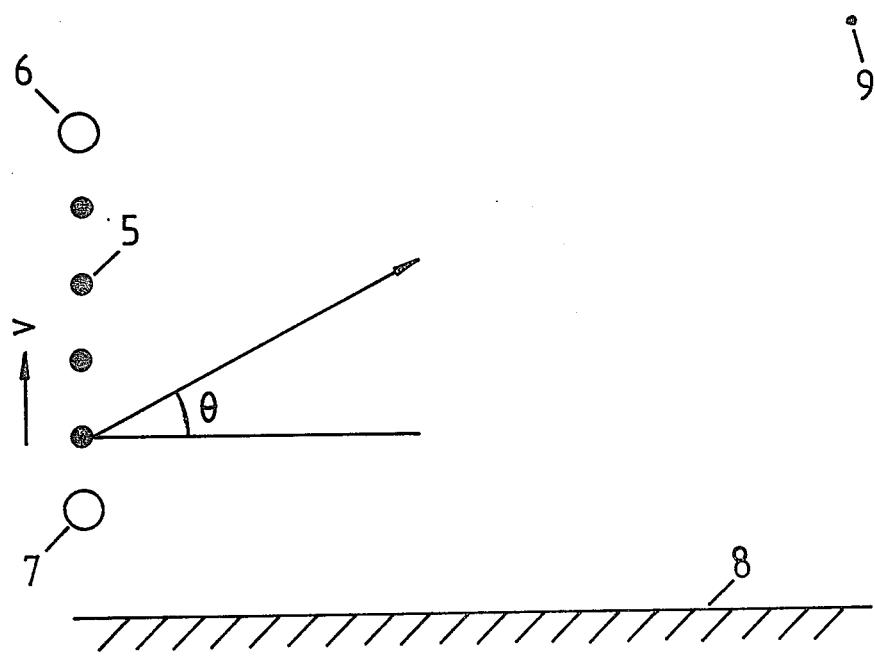
FIG. 2 is a schematic arrangement of the elevation antenna configuration.

The new system proposes the use of a number of baseline radiators and two reference radiators as illustrated in FIGS. 1 and 2. FIG. 1 consists of a horizontal baseline of radiating elements 1 some of which are shown at a, b, g and h together with two reference radiators 2 and 3, placed one at either end of the baseline 1, the whole arrangement being suitably positioned above ground level. The polar patterns of all the radiators are designed to cover the required coverage volume which typically is ±60° in azimuth and +30° in elevation. The baseline may vary in length from about 15λ to 60λ, with elements spaced about λ/2 apart, where λ≃6 cm. for C-band operation. The distant point 4 is in the far-field of the radiators and is situated anywhere within the coverage volume.

FIG. 2 is a schematic arrangement of the elevation configuration at the ground station. It consists of a vertical baseline of radiating elements 5 some of which are shown at j and k, together with two reference radiators 6 and 7, placed one at either end of the baseline 5, the whole arrangement being suitably positioned above ground level 8. The polar patterns of all the radiators are designed to cover the required coverage volume which typically is ±40° in azimuth and +30° in elevation. The baseline may vary in length from about 15λ to 60λ, with elements spaced about λ/2 apart as for the azimuth configuration. The distant point 9 is in the far-field of the radiators and is situated anywhere within the coverage volume.

Figure 3:
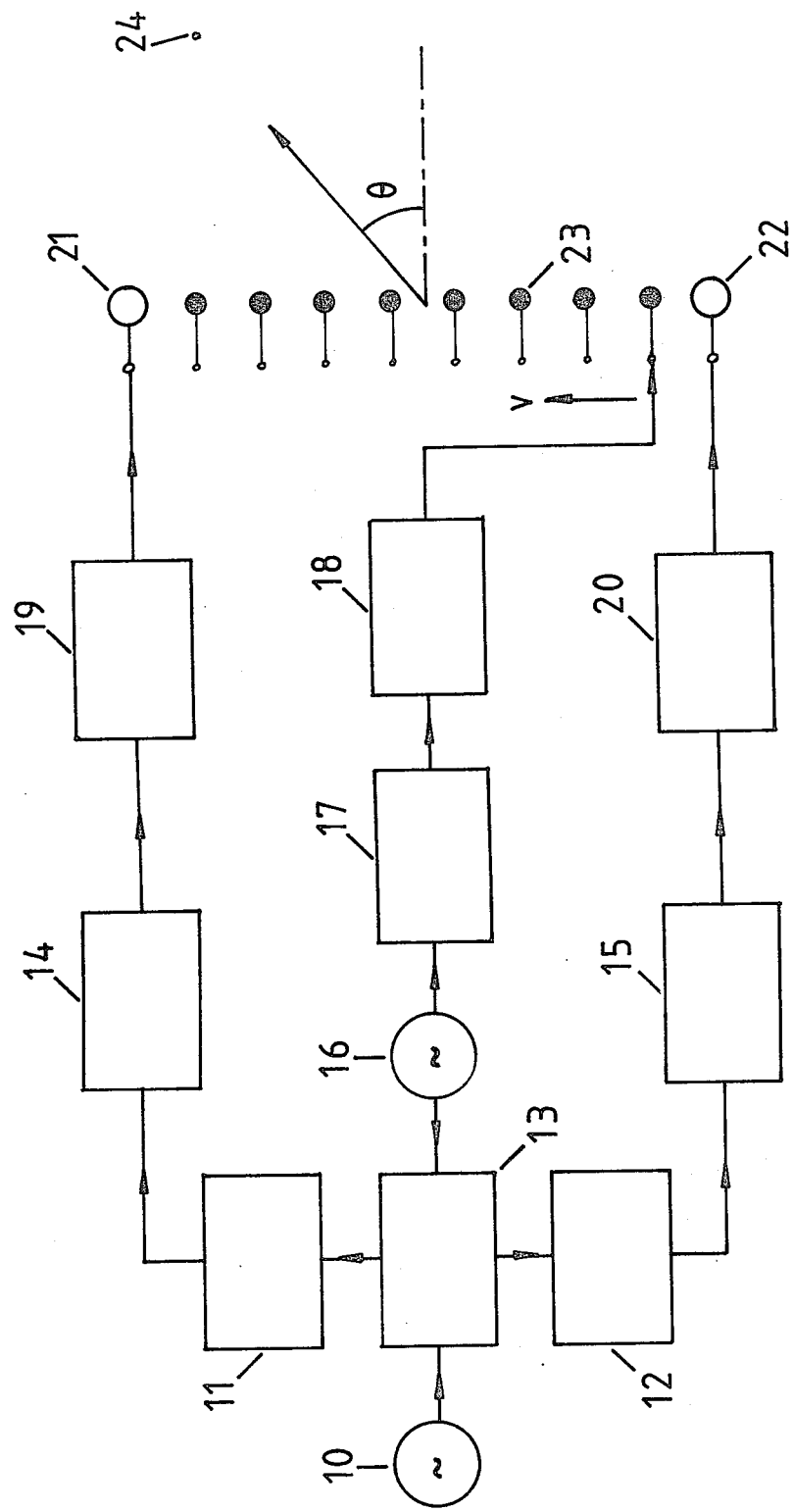
FIG. 3 is a schematic arrangement of a ground station transmitter for use with an azimuth or elevation antenna.
Figure 4:
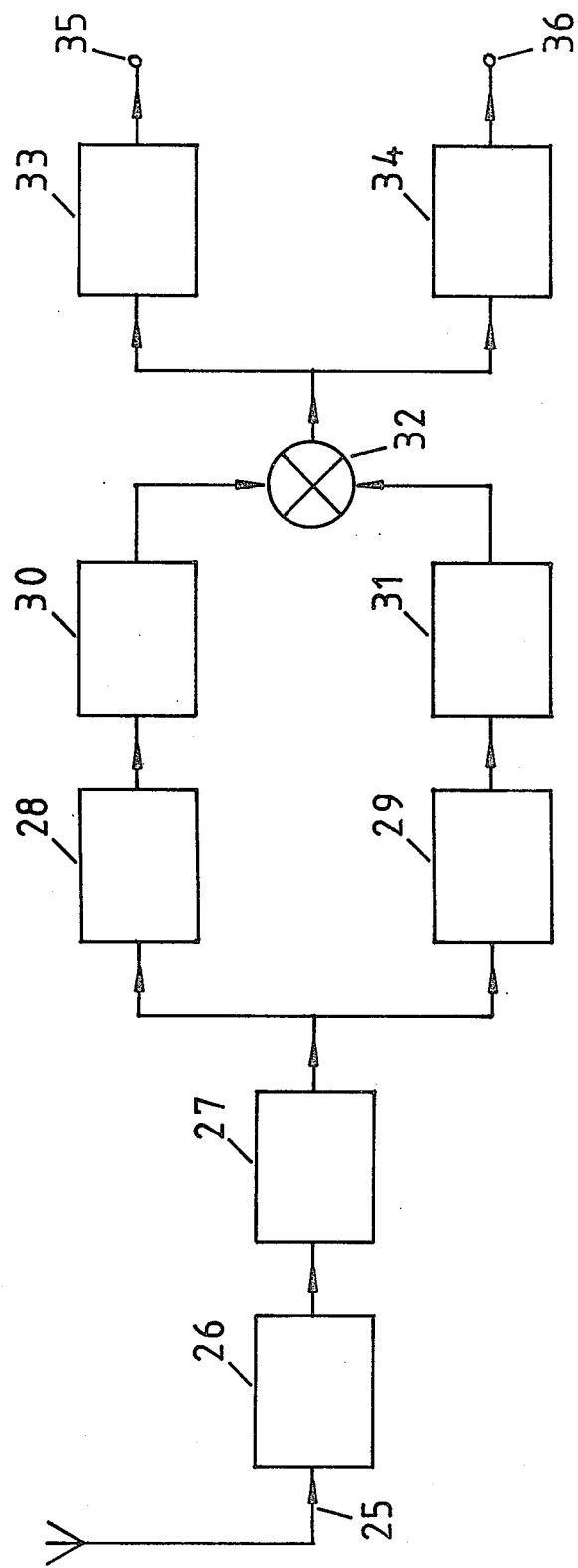
FIG. 4 is a schematic arrangement of an airborne receiver for receiving signals from either the azimuth or elevation antennas.

The operating principles of the system can be described with references to FIGS. 3 and 4. In FIG. 3, the baseline radiators 23 some of which are shown at l, m, r and s are energised one at a time at a microwave carrier frequency $f_c$. It simulates a moving radiator with velocity v and the radiators are energised sequentially in a to-and-fro movement (bi-directional scanning). Means are provided to feed each radiator with energy from a common microwave oscillator 16 and amplifier 17, and the commutation is provided by an electronic switching network 18.

The two stationary radiators 21 and 22 which are placed one at either end of the baseline 23, are energised continuously at microwave frequencies $(f_c+f_o)$ and $(f_c-f_o)$ respectively, where $f_o$ is the radio frequency of an offset oscillator 10. The reference frequencies are generated by mixing the carrier frequency $f_c$ and the offset frequency $f_o$ in a balanced modulator 13 and separating the two output frequencies by suitable sideband filters 11 and 12. Means are also provided for independently dithering the phase of the reference frequencies by phase shifters 14 and 15, for interchanging the reference frequencies at scan reversal (not shown) and for amplifying their power levels by amplifiers 19 and 20, so that each power level is about 3 dB greater than that of the commutated carrier level.

For an upscan or downscan, an aircraft at a distant point 24 in the upper sector will receive signals at frequencies $(f_c-f_o)$, $(f_c+f_o)$ and $(f_c\pm f_d)$ where $f_d$ is the Doppler frequency shift due to the moving radiator with velocity v. The Doppler shift is positive for one direction of scan and negative for the opposite direction of scan and is given by $$f_d = \frac{v \sin \theta}{\lambda} = \frac{L}{\lambda T_s} \sin \theta$$

or $$f_d = K \sin \theta$$

where $K = L/\lambda T_s$ is a design constant, L is the length of the baseline, $T_s$ is the single scan time, λ is the wavelength and $\theta$ is the angle between the direction of motion of the aircraft and the normal to the baseline radiators.

In FIG. 4, the received signals 25 after amplification 26, downconversion 27, joint separation of the carrier and one reference signal 28 and joint separation of the carrier and the other reference signal 29 are then detected by linear detectors 30 and 31. The carrier signal now beats with its appropriate reference signal to yield an upper sideband signal at frequency $(f_o+f_d)$ and a lower sideband signal at frequency $(f_o-f_d)$ where $f_d$ is the Doppler frequency shift which is related to the angular information $\theta$, and it can be extracted by multiplication of the two sideband signals in a product detector 32. The output signal after low-pass filtering 33 is the Doppler signal 35 at the difference frequency $2f_d$ and this doubling of the Doppler frequency shift $f_d$ leads to some bandwidth economy.

Since the Doppler effect is reversed in sign on scan reversal, multipath errors during an upscan tend to cancel those during a downscan. By using a single commutating source, bi-directional scanning is easily employed and by using a suitable measurement period (large time-bandwidth product), residual multipath errors in the Doppler frequency can be reduced to a low average value over several scans (multiscan averaging).

In addition to the two sideband signals, the airborne receiver also receives a beacon signal which is independent of its angular position. The beacon signal is due to the beat note between the two reference signals radiated from the reference radiators. It is more conveniently obtained by filtering the output from the product detector 32 by a band-pass filter 34 and the beacon signal 36 has the sum frequency $2f_o$, which is twice the known offset frequency $f_o$.

The great importance of the beacon signal is due to the fact that it can be accurately checked against the known design value $2f_o$ in the airborne receiver. In the presence of multipath effects due to reflections from various objects, the Doppler frequency $2f_d$ will be altered by a multipath error. However, this multipath error is due essentially to the ground reflection of the stationary reference signals which interfere with the direct reference signals in the airborne receiver. It can be evaluated at the receiver by a frequency check of the beacon signal frequency $2f_o$. Its value will differ from the true value $2f_o$ by the multipath error and a correction can be applied to the Doppler frequency $2f_d$.

The combined use of a Doppler frequency signal of variable value $2f_d$ and a beacon signal frequency of constant value $2f_o$ constitutes a frequency-comparison monopulse technique whereby sufficient angular information in elevation or azimuth can be obtained by means of a single unidirectional or bi-directional scan. This unique property is due to the normalizing ability of the beacon signal to detect and correct frequency errors in the Doppler signal. Multiscan averaging is subsequently employed to reduce any residual multipath error to a negligible value.

I claim:

1. A double sideband Doppler system comprising an arrangement for transmitting two reference signals continuously at different constant reference frequencies from two non-commutated reference radiators which are spaced more than $15\lambda$ apart, where $\lambda$ is the wavelength of either reference signal and are positioned one at either end of a set of suitably spaced commutated baseline radiators whose total baselength is at least $15\lambda$, said non-commutated reference radiators being separate from and additional to the set of commutated baseline radiators, and means are provided for transmitting a carrier signal continuously at a third frequency from any one of the set of commutated baseline radiators, said carrier signal being commutated during transmission by energising the set of commutated baseline radiators one at a time in succession, to simulate uniform linear motion in a to-and-fro movement along the set of commutated baseline radiators, said simulated motion producing a frequency shift $f_d$ of the carrier signal at a distant point due to the Doppler effect.

2. A double sideband Doppler system as claimed in claim 1 wherein said two reference signals are of different reference frequencies, one of said reference signals being at a frequency greater than said third frequency, the other of said reference signals being at a frequency less than said third frequency, said one and said other reference frequencies being greater than and less than, respectively, the third frequency by a suitable offset frequency $f_o$.

3. A double sideband Doppler system as claimed in claim 1 wherein means are provided for dithering the phase of each reference signal and for interchanging the reference signals with one another only, said dithering and interchanging taking place after each complete to-movement or after each complete fro-movement along the set of commutated baseline radiators for the purpose of cancelling phase errors in each reference signal.

4. A double sideband Doppler system as claimed in claim 1 wherein the three transmitted signals are received in an airborne receiver at a distant point in such a manner that a beat note between the carrier signal and one reference signal herein called the upper sideband signal acquires a positive Doppler frequency shift from the carrier signal, and a beat note between the carrier signal and the other reference signal herein called the lower sideband signal acquires a negative Doppler frequency shift from the carrier signal, said Doppler frequency shift $f_d$ being related to the angular direction of motion of the receiver in either azimuth or elevation.

5. A double sideband Doppler system as claimed in claim 1 wherein means are provided in the airborne receiver for obtaining from the two sideband signals, a difference-frequency signal herein called a Doppler signal of variable value $2f_d$ where $f_d$ is the Doppler frequency shift of the carrier signal, and a sum-frequency signal herein called a beacon signal of constant value $2f_o$ where $f_o$ is an offset frequency.

6. A double sideband Doppler system as claimed in claim 5 wherein the difference-frequency signal is used for extracting angular information in azimuth or elevation, and the sum-frequency signal is used for detecting and correcting frequency errors in the difference-frequency signal.

7. A double sideband Doppler system as claimed in claim 1 or 6 wherein the use of a sum-frequency signal to detect and correct frequency errors in the difference-frequency signal during a to-movement or during a to-and-fro movement is a frequency-comparison monopulse technique.

8. A double sideband Doppler system as claimed in claim 1 with an arrangement comprising all the commutated and non-commutated radiators suitably positioned side-by-side along a horizontal baseline for navigation purposes in the azimuth plane and with a similar arrangement comprising all the commutated and non-commutated radiators suitably positioned side-by-side along a vertical baseline for navigation purposes in the elevation plane.

* * * * *